(12) United States Patent
Keimig

(10) Patent No.: US 10,081,304 B2
(45) Date of Patent: Sep. 25, 2018

(54) REAR SPACE ARRANGEMENT FOR A VEHICLE, REAR SPACE ARRANGEMENT AND METHOD FOR FORMING AN EMERGENCY EXIT OPENING OUT OF A TRUNK OF A REAR SPACE ARRANGEMENT

(71) Applicant: GM GLOBAL TECHNOLOGY OPERATIONS LLC, Detroit, MI (US)

(72) Inventor: Udo Keimig, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 8 days.

(21) Appl. No.: 15/290,423

(22) Filed: Oct. 11, 2016

(65) Prior Publication Data

US 2017/0101060 A1 Apr. 13, 2017

(30) Foreign Application Priority Data

Oct. 12, 2015 (DE) .................. 10 2015 013 198

(51) Int. Cl.
*B60R 5/04* (2006.01)
*B62D 39/00* (2006.01)

(52) U.S. Cl.
CPC .............. *B60R 5/045* (2013.01); *B62D 39/00* (2013.01)

(58) Field of Classification Search
CPC ................................ B60R 5/045; B62D 39/00
USPC ...................................................... 296/24.43
See application file for complete search history.

(56) References Cited

U.S. PATENT DOCUMENTS

| 4,932,704 A | 6/1990 | Ament |
| 6,369,395 B1 * | 4/2002 | Roessler ................. E05B 83/16 250/462.1 |
| 2008/0088145 A1 | 4/2008 | Schlecht |

(Continued)

FOREIGN PATENT DOCUMENTS

| DE | 102006009771 A1 | 9/2007 |
| EP | 2100776 A1 | 9/2009 |
| FR | 2986479 A3 | 8/2013 |

(Continued)

OTHER PUBLICATIONS

German Patent Office, German Search Report for German Application No. 102015013198.2, dated Jul. 13, 2016.

(Continued)

*Primary Examiner* — Joseph D. Pape
*Assistant Examiner* — Dana D Ivey
(74) *Attorney, Agent, or Firm* — Lorenz & Kopf, LLP

(57) ABSTRACT

A rear space arrangement for a vehicle includes a trunk and with a tailgate, which is transferrable from a closed state into an opened state, a backseat bench, a trunk wall and a trunk cover. The tailgate, the backseat bench, the trunk wall and the trunk cover jointly enclose the trunk. The trunk cover includes a front cover portion that is directed forward towards the backseat bench and a rear cover portion which is directed rearward towards the tailgate. The rear space arrangement includes at least one front coupling portion, to which the front cover portion is coupled in a coupled state. The front cover portion can be decoupled from the at least one front coupling region and transferrable into a decoupled state when the tailgate assumes the closed state.

14 Claims, 3 Drawing Sheets

(56) References Cited

U.S. PATENT DOCUMENTS

2014/0015270 A1    1/2014  Staib

FOREIGN PATENT DOCUMENTS

JP          2000238581  A       9/2000
JP          2008285048  A      11/2008

OTHER PUBLICATIONS

New Škoda Octavia Combi, https://media.skoda-auto.com/en/_layouts/Skoda.PRPortal/pictures.aspx?q=_rs&category=0&refiners=5%7C53%7C127&type=0&pagesize=36&pageindex=3.

Cargo Cover, Aug. 2008, http://www.hondapartsnow.com/installation/cr-v/2009-cr-v-cargo-cover.pdf.

Cargo Cover, http://www.mitsubishicars.com/outlander/accessories.

* cited by examiner

REAR SPACE ARRANGEMENT FOR A VEHICLE, REAR SPACE ARRANGEMENT AND METHOD FOR FORMING AN EMERGENCY EXIT OPENING OUT OF A TRUNK OF A REAR SPACE ARRANGEMENT

CROSS-REFERENCE TO RELATED APPLICATION

This application claims priority to German Patent Application No. 102015013198.2, filed Oct. 12, 2015, which is incorporated herein by reference in its entirety.

TECHNICAL FIELD

The present disclosure pertains to a rear space arrangement for a vehicle configured to form an emergency exit opening out of a trunk of the rear space arrangement.

BACKGROUND

In most vehicles, a trunk cover for covering a trunk is arranged. Trunk covers are already known which can be folded to provide access to the trunk with the tailgate of the vehicle opened.

For example, DE 10 2006 009 771 A1 describes a parcel shelf for a motor vehicle with panels that can be pivoted with respect to one another. Once in the pivoted states, the panels can be stacked on top of one another.

SUMMARY

The present disclosure provides a functionally improved trunk cover which, with close tailgate, can be at least partly removed or opened. According to an embodiment, a rear space arrangement for a vehicle, in particular a passenger car, is disclosed. Preferably, the vehicle is designed as a hatchback or a sport utility vehicle (SUV). Compared with conventional vehicles, such vehicles have enlarged trunks and/or load compartments.

The rear space arrangement includes a trunk, which is configured as a stowage and/or load compartment for luggage and other items. The rear space arrangement includes a trunk wall, a tailgate, a backseat bench and a trunk cover, which jointly enclose the trunk.

Preferably, the trunk wall has a first, second and third wall portion. In particular, the first and second wall portion are arranged transversely to a travelling direction of the vehicle located opposite one another. Optionally, the third wall portion is arranged below the closed tailgate and located opposite the backseat bench. In particular, the third wall portion joins the first and second wall portion. For example, passengers of the vehicle can take a seat on the backseat bench.

Preferably, the trunk cover is designed for covering and/or screening the trunk, in particular from the top. In particular, the trunk cover is arranged spaced and substantially parallel, in particular parallel to a floor of the trunk. Specifically, the trunk cover extends transversely to the traveling direction of the vehicle from the first wall portion to the second wall portion. Optionally, the trunk cover extends in travelling direction of the vehicle, preferably completely, from the backseat bench to the tailgate.

Preferably, the tailgate closes the vehicle at the back. It can be transferred from a closed state into an opened state. Preferably, a user can access the trunk from outside of the vehicle when the tailgate is in the opened state. Optionally, the trunk cover is pivotably connected to the tailgate so that in the opened state of the tailgate it is partly raised from a position covering the trunk in order to provide access to the trunk.

The trunk cover includes a front cover portion which is arranged directed to the rear seat bench, in particular in travelling direction of the vehicle towards the front. Optionally, the trunk cover includes a rear cover portion which is arranged directed to the tailgate, in particular against the travelling direction towards the back.

The rear space arrangement includes at least one front coupling portion, and preferably two front coupling portions, for coupling to the front cover portion. The front cover portion is coupled in the front coupling portion in a coupled state. For example, the front coupling portion is arranged adjacent to the backseat bench and/or in the direction of the backseat bench on the trunk wall. Here it is preferred that a first front coupling portion is arranged on the first wall portion and a second front coupling portion on the second wall portion. It is possible, within the scope of the present disclosure, that each wall portion includes a console, which includes the respective front coupling portion. Alternatively, it is possible that the front coupling portion is arranged on the backseat bench or connected to the same.

It is preferred that the front cover portion in the coupled state is directed towards the top, in particular to a vehicle roof, downwards, in particular directed to the trunk floor, and towards the front, positively locked in the at least one front coupling region. It is particularly preferred that the front cover portion is detachable and removable towards the back out of the at least one coupling region, preferably without tools. In particular, the trunk cover with opened tailgate can be pulled back from outside of the vehicle and removed from the vehicle.

The front cover portion can be decoupled and transferred into a decoupled state from the front coupling portion, preferably without tools, when the tailgate assumes the closed state. In particular, the front cover portion in the closed state of the tailgate can be moved towards the back out of the front coupling region and/or detached from the same. It is particularly preferred that the rear cover portion with closed tailgate is coupled in the rear coupling region, when the front cover portion is decoupled from the front coupling region and assumes the decoupled state.

The rear space arrangement offers safety-relevant advantages to a person, for example a child, who is unintentionally locked in the trunk by the trunk cover and the closed tailgate. In particular, through the possibility of decoupling the front cover portion, the person can independently escape from the trunk in particular from below. Specifically, the possibility is created to enter a passenger compartment of the vehicle, in particular by way of the backseat bench, with the tailgate closed and the front cover portion decoupled. Because of this, dangers faced by a person enclosed in the trunk such as lack of food and/or oxygen and the effects of heat or cold can be avoided.

In a preferred embodiment of the present disclosure, the front cover portion can be transferred into the decoupled state by a force application from below, in particular originating from the trunk and directed upwards against the trunk cover. In particular, the front cover portion can be decoupled out of the front coupling region through pressure against a bottom side of the trunk cover directed towards the floor of the trunk. For example, the person can press against the bottom side of the trunk cover with the hand or with the body, in particular when getting up in the trunk and decouple the front cover portion. It is preferred that in the decoupled state of the front cover portion an emergency exit opening for the person is formed, through which the person can get out of the trunk with closed tailgate.

In a preferred configuration of the present disclosure, the emergency exit opening is arranged between the backseat bench and the rear cover portion. Because of this it is made possible that the person who is unintentionally locked in the trunk can get up through the emergency exit opening and by climbing over the backseat bench leave the vehicle.

In a preferred configuration of the present disclosure, the rear space arrangement includes at least one rear coupling portion, and preferably two rear coupling portions, for coupling to the rear cover portion. In particular, the rear cover portion is coupled in the rear coupling portion, it being in the coupled state. It is possible, within the scope of the present disclosure, that the trunk wall includes the rear coupling portion. For example, the rear coupling portion is arranged adjacent to the tailgate and/or in the direction of the tailgate on the trunk wall. Here it is preferred that a first rear coupling portion is arranged on the first wall portion and a second rear coupling portion on the second wall portion. Alternatively, it is possible that the rear coupling portion is arranged on the third wall portion. Alternatively or optionally, the coupling portion can be arranged on the tailgate.

Preferably, the rear cover portion is positively locked downwards in the coupled state. Optionally, the rear cover portion is positively locked in the coupled state and with closed tailgate towards the back, in particular by way of the closed tailgate or the third wall portion. Preferably, the rear cover portion is moveable towards the top only to a very limited degree because the closed tailgate. Because of this, the rear cover portion in the closed state of the tailgate is also largely positively locked towards the top. In particular, the rear cover portion cannot be independently detached from the front cover portion out of the rear coupling region. Accordingly, slipping and unintentional detaching of the trunk cover out of the coupling regions are avoided. In particular, a secure and non-slip positioning of the trunk cover while travelling in the vehicle can be ensured.

For example, the first cover portion and/or the second cover portion include a rigid material. Alternatively, the first cover portion and/or the second cover portion are formed out of the rigid material. Preferably, the rigid material is a hard foam, for example a form made out of polyurethane, a so-called PUR foam. Alternatively, a plastic material as rigid material is also possible. Preferably, the first cover portion and/or the second cover portion is covered with a textile cover in particular to improve the appearance and feel. The textile cover is formed for example as a carpet fabric.

In a preferred implementation of the present disclosure, the front and the rear cover portion are pivotably connected to one another about a pivot axis by way of at least one hinge device. Optionally, the front cover portion is pivotable relative to the rear cover portion by at least 120 degrees, preferably by at least 180 degrees and in particular by at least 240 degrees. By way of the hinge device it is made possible that the front cover portion during the force application from below, can be pivoted relative to the rear cover portion in particular from the trunk against the bottom side of the trunk cover and can assume a pivot position. Preferably, in the pivot position, a tip or a roof that is directed upwards is formed by the front and rear cover portion, as a result of which an overall length of the trunk cover directed in travelling direction is shortened. Because of the shortening, the front cover portion is moved backwards out of the front coupling region and detached from the same, so that the emergency exit opening for the person enclosed in the trunk is formed.

For example, the hinge device includes a textile material and/or the hinge device is formed out of the textile material. It is possible, within the scope of the present disclosure, that the hinge device is formed by the textile cover of the front and/or rear cover portion. This is preferred in particular in the case of a common textile cover of both cover portions. Because of this, a component number can be reduced and costs saved. Alternatively, it is possible that the hinge device is formed by way of an additional flat piece of textile, which preferably connects both cover portions to one another and runs along the pivot axis. The hinge made out of the textile material offers the advantage of low material costs. Furthermore, the textile hinge has a low weight which can have an advantageous effect on fuel consumption in particular when used in the vehicle. It is also possible within the scope of the present disclosure that instead of the textile material another suitable hinge, for example a hinge strap, is used.

A further subject of the present disclosure relates to a vehicle with a rear space arrangement according to the previous description.

Furthermore, a method is disclosed for forming an emergency exit opening out of a trunk of a rear space arrangement, preferably of the rear space arrangement according to the previous description. Within the scope of the method, a force is exerted from below, in particular from the trunk, upwards onto the trunk cover, in particular onto the bottom side of the same, as a result of which the front cover portion is transferred into the state in which it is decoupled from the at least one front coupling region.

Optionally, the front cover portion during the force application onto the trunk cover is pivoted about the pivot axis and relative to the rear cover portion so that the front cover portion moves backwards out of the at least one front coupling region and/or detaches from the same.

Within the scope of the method it is preferred, furthermore, that the front cover region in the decoupled state and with closed tailgate forms an emergency exit opening out of the trunk, through which a person can get out of the trunk, in particular by way of the backseat bench.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
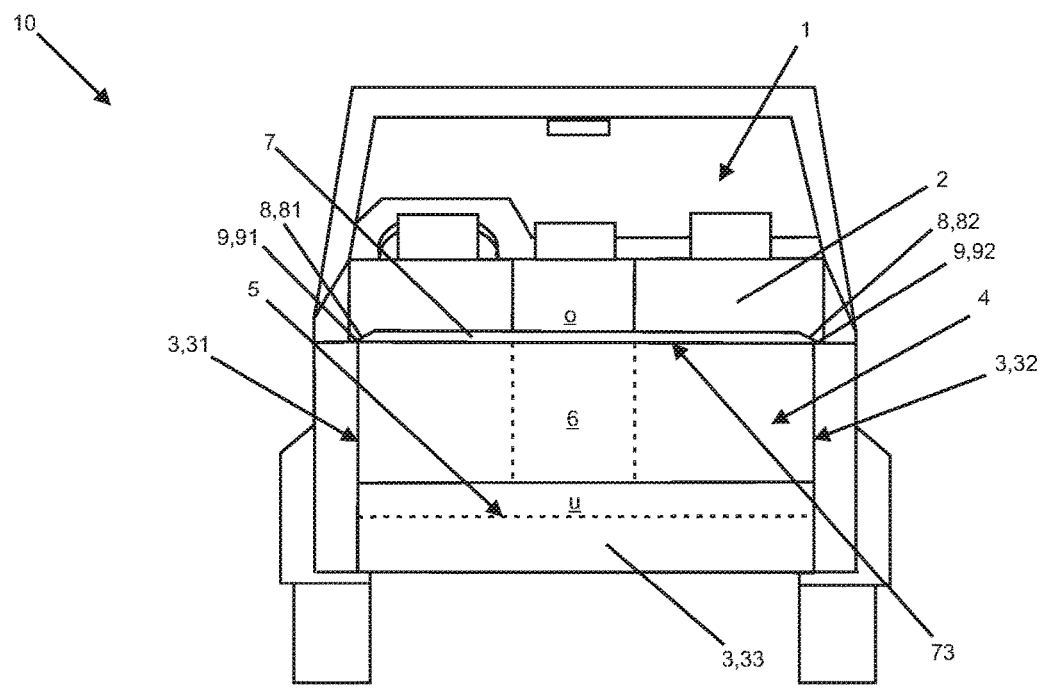
FIG. 1 is a schematic plane view of a rear space arrangement of a vehicle including a trunk and a trunk cover.

FIG. 1 shows a plane view from the back onto a rear space arrangement 1 of a vehicle 10 with a transparently shown tailgate 4, in particular of a passenger car, for example a hatchback or a sport utility vehicle (SUV). The rear space arrangement 1 includes a backseat bench 2, a trunk wall 3 with a first, second and third walls portion 31, 32, 33, the tailgate 4, a trunk floor 5, a trunk 6 and a trunk cover 7.

The trunk 6 is designed as a stowage compartment for luggage and other items. The backseat bench 2, the trunk wall 3, the tailgate 4, the trunk floor 5 and the trunk cover 7 enclose the trunk 6. Here, the trunk floor 5 limits the trunk 6 towards the bottom. The backseat bench 2 limits the trunk 6 towards the front v, in particular in a travelling direction F of the vehicle. The first and second wall portions 31, 32 are arranged in travelling direction F located opposite and limit the trunk 6 towards both sides. The third wall portion 33 is arranged below the tailgate 4 and limits the trunk 6 optionally jointly with the tailgate 4 from the back, in particular in a direction which is directed against the travelling direction F, specifically towards the tailgate 4.

The tailgate 4 can be transferred from a closed state Z into an opened state A, wherein a user in the opened state A of the tailgate 4 has access to and/or into the trunk 6. The trunk cover 7 covers and/or screens the trunk 6 from the top. It extends in travelling direction F from the tailgate 6 as far as to the backseat bench 2 and transversely to the travelling direction F from the first wall portion 31 to the second wall portion 32.

The rear space arrangement 1 includes at least one front coupling region 8 and at least one rear coupling region 9 for coupling to the trunk cover 7. The at least one front coupling region 8 is formed as a first and second coupling region 81, 82, The first coupling region 81 is arranged on the first wall portion 31, the second front coupling region 82 on the second wall portion 32. For example, the wall portions 31, 32 include consoles in which the corresponding coupling regions 81, 82 are arranged.

In the front coupling regions 81, 82 the trunk cover 7 is positively locked downwards u, towards the front v and upwards o. Towards the back h, the trunk cover 7 can be moved out of the at least one coupling region 8 and/or detached only when the tailgate 4 assumes the opened state A. In particular, the trunk cover 7 in the opened state A of the tailgate 4 can be pulled out of the at least one front coupling region 8 towards the back h, in particular through the opened tailgate 4. By contrast, the trunk cover 7 is positively locked in the at least one front coupling region 8 in the closed state Z by way of the tailgate 4.

The at least one rear coupling region 9 is formed for example as a first and second rear coupling region 91, 92. It is arranged on the third wall portion 33 and/or on the tailgate 4. Alternatively, the first rear coupling region 91 can be arranged on the first wall portion 31 and the second rear coupling region 92 on the second wall portion 32.

In the at least one rear coupling region 9, the trunk cover 7 is positively locked downwards. Towards the front, the trunk cover 7 is positively locked by the front coupling regions 81, 82, towards the back h and largely upwards o by way of the closed tailgate 4. Accordingly, the trunk cover 7, with closed tailgate 4, in particular while the vehicle 10 is travelling, cannot unintentionally slip out of the position in which it covers the trunk 6.

Figure 2:
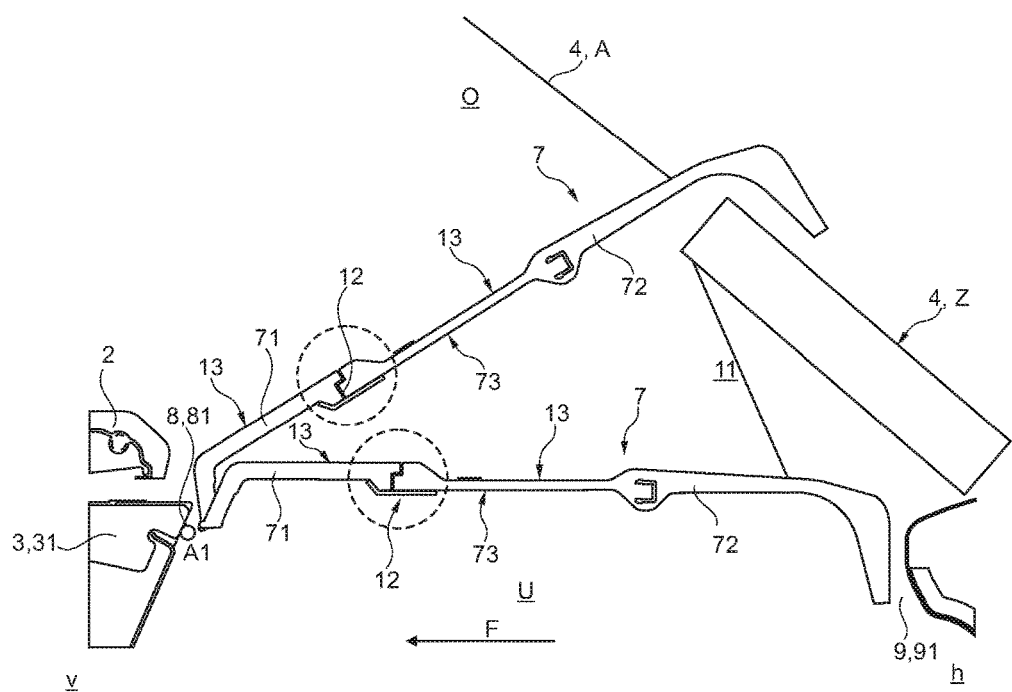
FIG. 2 is a lateral plane view of the rear space arrangement from FIG. 1 with a trunk cover covering the trunk.

FIG. 2 shows the rear space arrangement 1 from FIG. 1 in a lateral plane view. The trunk cover 7 is connected to the tailgate 4 for example by way of a cord 11 so that it is lifted jointly with the same during the transfer from the closed state Z into the opened state A. During the lifting, the trunk cover 7 is pivoted about a first pivot axis A1, which runs through the two front coupling regions 81, 82. Accordingly, the trunk cover 7 during the opening of the tailgate 4 remains coupled in the front coupling regions 81, 82 and is lifted on the side directed towards the back h.

The trunk cover 7 includes a front cover portion 71 directed towards the backseat bench 2 and a rear cover portion 72 directed towards the tailgate 4. The front cover portion 71 maximally includes a half, preferably maximally a third of a total area of the trunk cover 7.

The trunk cover 7 is formed from a rigid material, in particular from a rigid foam material, e.g. a polyurethane foam, in particular PUR foam. Optionally, it has a textile cover 13, which is formed for example as a carpet. Because of this, an appearance and/or feel of the trunk cover 7 can be improved. Optionally, it is a common textile cover 13 which completely covers and joins both cover portions 71, 72 to one another.

The two cover portions 71, 72 are pivotably connected to one another about a second pivot axis A2 by way of a hinge device 12. The second pivot axis A2 runs transversely to the travelling direction F, in particular in a direction that is directed from the first wall portion 81 to the second wall portion 82. By way of the hinge device 12, the first cover portion 71 is pivotable relative to the second cover portion 72 by at least 120 degrees, preferably by at least 180 degrees and in particular by at least 240 degrees. An open end of the first cover portion 71 directed towards the front is pivotable downwards u about the second pivot axis A2. Because of this, the trunk cover 7 folds upwards so that a tip 14 (FIG. 3) or a roof is formed by the trunk cover 7 above the trunk 6. Folding the trunk cover 7 downwards is blocked by the hinge device 12.

The hinge device 12 connects the first and second cover portion 71, 72 to one another. It is formed by a flat textile material, in particular by a textile strip which extends in particular on a bottom side 73 of the trunk cover 7 along the second pivot axis A2. Alternatively or optionally, the common textile cover 13 of both cover portions 71, 72 forms the hinge device 12.

Figure 3:
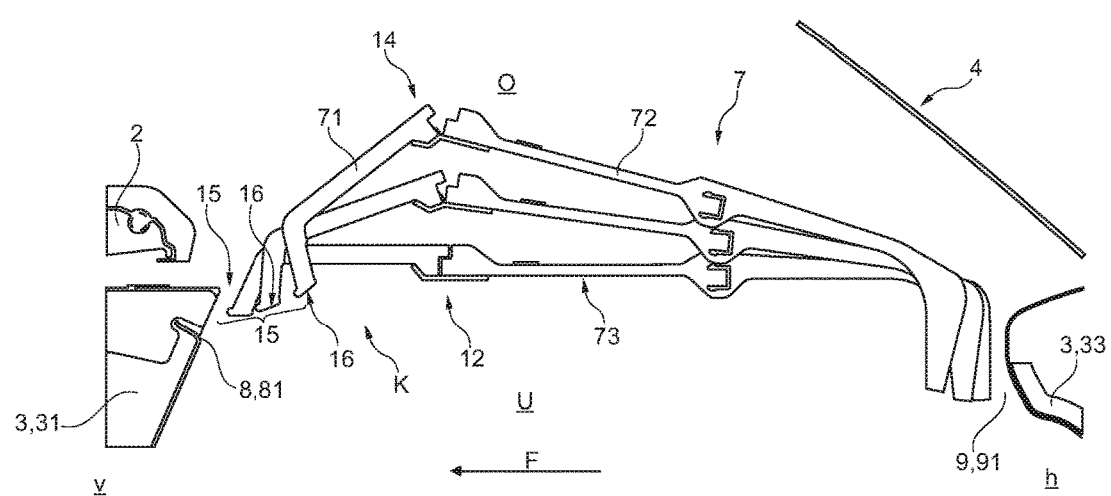
FIG. 3 shows the rear space arrangement from FIG. 2, wherein a force acts onto the trunk cover from below, so that an emergency exit opening for exiting the trunk is formed.

FIG. 3 shows the rear space arrangement 1 from FIG. 2 with the trunk cover 7, which is pivoted about the second pivot axis A2. When a person is unintentionally closed into the trunk 6 with the tailgate 4 closed, the person can cause the first cover portion 71 to pivot by pressing against the bottom side 73 of the trunk cover 7 with the hand or by getting up with the body in the trunk 6. In particular, the person exerts a force K on the bottom side 73 of one of the two cover portions 71, 72 or against the hinge device 12.

When exerting the force K, the first cover portion 71 pivots relative to the second cover portion 72, in particular downwards u with the front open end. Because of this, the two cover portions 71, 72 together form the tip 14 or the roof above the trunk 6, as a result of which a total length of the trunk cover 7 extending in travelling direction F is shortened relative to a position in which it covers the trunk 6. Because of this, the first cover portion 71 moves towards the back h with the front open end and out of the front coupling regions 81, 82. The front cove portion 71 detaches from the front coupling portions 81, 82 so that between the backseat bench 2 and the rear cover portion 72 an emergency exit opening 15 for the person enclosed in the trunk 6 is formed. Through the emergency exit opening 15, the person can get into a passenger compartment of the vehicle by way of the backseat bench and draw attention to himself/herself or leave the vehicle. Accordingly, the possibility of pivoting the first cover portion 71 and forming the emergency exit opening, dangers caused by the effect of heat or cold and/or through a lack of food and/or oxygen in the closed trunk 6 can be avoided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A rear space arrangement for a vehicle comprising:
a trunk;
a tailgate which is transferrable from a closed state into an opened state;
a backseat bench;
a trunk wall;
a trunk cover including a front cover portion directed forward towards the backseat bench and a rear cover portion directed rearward towards the tailgate, wherein the tailgate, the backseat bench, the trunk wall and the trunk cover jointly enclose the trunk;
at least one front coupling portion configured to couple with the front cover portion in a coupled state, wherein the front cover portion can be decoupled from the at least one front coupling portion and transferrable into a decoupled state when the tailgate assumes the closed state; and
a textile hinge device pivotably connecting the front cover portion and the rear cover portion to one another about a pivot axis.

2. The rear space arrangement according to claim 1, wherein the front cover portion can be transferred into the decoupled state through a force application directed from below in a direction from the trunk upwards into the trunk cover.

3. The rear space arrangement according to claim 1, further comprising an emergency exit opening for a person that is present in the trunk with closed tailgate when the front cover portion is in the decoupled state, wherein the emergency exit opening is arranged between the backseat bench and the rear cover portion.

4. The rear space arrangement according to claim 1, further comprising at least one rear coupling portion, to which the rear cover portion is coupled.

5. The rear space arrangement according to claim 1, wherein the rear cover portion is positively locked towards a front, towards a back and towards a top when the rear cover portion is in the coupled state and the tailgate is in the closed state.

6. The rear space arrangement according to claim 5, wherein the front cover portion is positively locked in the at least one front coupling portion towards the top, towards the bottom and towards the front.

7. The rear space arrangement according to claim 5, wherein the front cover portion in the coupled state can be moved out of the at least one front coupling portion by pivoting about the pivot axis towards the back at the textile hinge.

8. The rear space arrangement according to claim 1, wherein each of the front cover portion and the rear cover portion comprise a rigid material.

9. The rear space arrangement according to claim 1, wherein the trunk wall comprises a first wall portion and a second wall portion located opposite the first wall portion transversely to a travelling direction of the vehicle, wherein the pivot axis extends from the first wall portion to the second wall portion.

10. The rear space arrangement according to claim 1, wherein the trunk cover defines a total area, and wherein the front cover portion defines an area that is less than or equal to one-third of the total area.

11. The rear space arrangement according to claim 1, wherein the at least one front coupling portion is incorporated into the backseat bench.

12. A vehicle comprising:
a backseat bench;
a tailgate which is transferrable from a closed state into an opened state;
a trunk wall;
a trunk cover including a front cover portion directed forward towards the backseat bench and a rear cover portion directed rearward towards the tailgate;
wherein the tailgate, the backseat bench, the trunk wall and the trunk cover jointly enclose a trunk;
at least one front coupling portion configured to couple with the front cover portion in a coupled state, wherein the front cover portion can be decoupled from the at least one front coupling portion and transferrable into a decoupled state when the tailgate assumes the closed state,
wherein the rear cover portion is positively locked towards a front, towards a back, and towards a top when in the coupled state and with the tailgate is in the closed state.

13. A method for forming an emergency exit opening out of a trunk of a rear space arrangement having a trunk, a tailgate, a backseat bench, a trunk wall and a trunk cover including a front cover portion coupled in at least one front coupling portion of the rear space arrangement and a rear cover portion, wherein the backseat bench, the tailgate, the trunk wall and the trunk cover jointly enclose the trunk, the method comprising:
exerting a force from below out of the trunk towards a top against the trunk cover such that the front cover portion is transferred into a state in which it is decoupled from the at least one front coupling portion by moving towards the back, out of the at least one front coupling portion, and the front cover portion is pivoted about a pivot axis formed by a textile hinge device pivotably connecting the front cover portion and the rear cover portion.

14. The method according to claim 13, further comprising moving the front cover portion into a decoupled state and with closed tailgate to form an emergency exit opening through which a person can get out of the trunk.

* * * * *